US007397860B1

(12) United States Patent
Duvaut et al.

(10) Patent No.: US 7,397,860 B1
(45) Date of Patent: Jul. 8, 2008

(54) FRACTIONAL LOCAL PEAK DETECTION AND MITIGATION FOR PAR REDUCTION

(75) Inventors: Patrick Duvaut, Belford, NJ (US); Laurent Pierrugues, Rahway, NJ (US); Peter Kleewein, Eatontown, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 997 days.

(21) Appl. No.: 10/263,506

(22) Filed: Oct. 4, 2002

Related U.S. Application Data

(60) Provisional application No. 60/327,188, filed on Oct. 4, 2001.

(51) Int. Cl.
*H04L 27/28* (2006.01)
(52) U.S. Cl. .................................... 375/260
(58) Field of Classification Search ................ 375/259, 375/260, 295, 296
See application file for complete search history.

(56) References Cited

U.S. PATENT DOCUMENTS

| 5,302,914 | A |   | 4/1994  | Arntz et al. |         |
|-----------|---|---|---------|--------------|---------|
| 5,638,403 | A | * | 6/1997  | Birchler et al. | 375/296 |
| 6,130,918 | A |   | 10/2000 | Humphrey et al. |      |
| 6,240,141 | B1|   | 5/2001  | Long         |         |
| 6,424,681 | B1|   | 7/2002  | Tellado et al. |       |
| 6,674,810 | B1| * | 1/2004  | Cheng        | 375/296 |
| 2001/0022777 | A1 |   | 9/2001 | Bourget et al. |     |

OTHER PUBLICATIONS

J. Tellado et al., "PAR Reduction in Multicarrier Transmission Systems," ANSI T1E1.4, Feb. 1998, pp. 1-14.
M. Zekri et al., "Peak-to-Average Power Reduction for Multicarrier," Belgium, 4 pages, no date available.
W. Henkel et al., "PAR reduction revisted: an extension to Tallado's method," Telecommunications Research Center Vienna, 6th International OFDM-Workshop (InOWo) Sep. 18-19, 2001, Hamburg, pp. 31-1-31-6.
A. Garcia et al., "Improving Peak-to-Average power Ratio (PAR) and Probability of Error in OFDM-based WLAN," 1ST Summit 2001, 6 pages.
D. A. Wiegandt et al., "Overcoming Peak-To-Average Power Ratio Issues In OFDM Via Carrier-Interferometry Codes," Vehicular Technology Conference, 2001, Fall IEEE VTS 54th, 2():660-663, vol. 2.

(Continued)

Primary Examiner—Kevin M Burd
(74) Attorney, Agent, or Firm—Thomas, Kayden, Horstemeyer & Risley LLP

(57) ABSTRACT

A method and system for reducing the power to average ratio (PAR) at the transmitter and after the up sampling and interpolation filter. In the time domain, Fractional Local Peak Detection and Mitigation (FLPDM) locally (i.e. in the neighborhood where the high peak occur) detects the high peaks at a sampling rate of T/K and combines an optimal binary and a PAR-lowering sequence at the scale of one extended symbol for multi-carrier modulation and at the scale M of symbols for single-carrier modulation. Since the technique acts locally, FLPDM does not require peaks search and processing at the scale of many time samples, does not require iterative Fast Fourier Transform (FFT) and Inverse Fast Fourier Transform (IFFT) processing and it assures tunable millions of instruction per second (MIPS) performance.

11 Claims, 15 Drawing Sheets

OTHER PUBLICATIONS

S. Kiaei et al., "Optimum channel shortening for discrete multitone transceivers," Acoustics, Speech, and Signal Processing, 2000, Proceeding IEEE International Conference, 5():2965-2968, vol. 5.

E. Lawrey et al., "Peak to average power ratio reduction of OFDM signals using peak reduction carriers," Signal Processing and Its Application, 1999, Proceedings of the Fifth International Symposium, 2():737-740, vol. 2.

W. Henkel et al., "Another application for trellis shaping: PAR reduction for DMT (OFDM)," Communications, IEEE Transations, 48(9):1471-1476, 2000.

C. Meyer, "Measuring the Peak-To-Average Power of Digitally-Vector-Modulated Signals," Annual Wireless Symposium—1st Proceedings of The Annual Wireless Symposium, 1993, pp. 351-354.

C. Schurgers, "Systematic approach to peak-to-average power ratio in OFDM (4474-53),"Advanced signal processing algorithms, algorithms, architectures, and implementations-Conference; 11th Proceedings-SPIE The International Society For Optical Engineering, 2001; vol. 4474, pp. 454-464.

W. Henkel, "Analog Codes for Peak-to-Average Ratio Reduction," Source and channel coding-Conference; 3rd ITG Fachbericht, 2000; No. 159, pp. 151-156.

* cited by examiner

FRACTIONAL LOCAL PEAK DETECTION AND MITIGATION FOR PAR REDUCTION

CROSS REFERENCE TO RELATED APPLICATIONS

Priority is claimed based on U.S. Provisional Application No. 60/327,188 entitled "FLPDM Fractional Local Peak Detection & Mitigation For PAR Reduction" filed Oct. 4, 2001.

FIELD OF THE INVENTION

The invention relates to fractional local peak detection and mitigation for the reduction of peak-to-average ratio (PAR) for single-carrier and multi-carrier modulation schemes in Digital Subscriber Lines (xDSL).

BACKGROUND OF THE INVENTION

High-bandwidth technologies which are prevalent nowadays use the existing copper wire infrastructure intended for plain old telephones (POTS) communication. One such technology is Digital Subscriber Line (DSL) which comes in multiple variations such as ADSL, HDSL, IDSL, SDSL, RADSL and VDSL collectively known as xDSL. Asymmetric digital subscriber line (ADSL) allows users a higher data rate downstream (i.e. to the customer) than upstream (i.e. the service provider).

These high-bandwidth systems use single-carrier modulation as well as multi-carrier modulation schemes, such as Carrier-less Amplitude and Phase modulation (CAP) and Discrete Multi-tone (DMT) for wired media and Orthogonal Frequency Division Multiplexing (OFDM) for wireless communication. One advantage of such schemes is that they are suited for high-bandwidth application of 2 Mbps or higher upstream (subscriber to provider) and up to 8 Mbps downstream (provider to subscriber). Quadrature Amplitude Modulation (QAM) utilizes a sine and cosine wave with the same frequency component to convey the information. The x and y components of the point to which the bits are mapped specify the amplitude of the sine and cosine waves and, because of the orthogonality between the waves, the data can be sent over the channel simultaneously. The amplitude (including sign and magnitude) of each wave conveys the information (bits) being sent. QAM modulation has been used in voice-band modem specifications, including the V.34.

CAP is similar to QAM. For transmission in each direction CAP systems use two carriers of identical frequency above the 4 KHz voice band, one shifted 90 degrees relative to the other. CAP also uses a constellation to encode bits at the transmitter and decode bits at the receiver. The x and y results from the encoding process are then used to excite a digital filter.

DMT modulation, sometimes called orthogonal frequency division multiplexing (OFDM), builds on some of the ideas of QAM but, unlike QAM, it uses more than one constellation encoder where each encoder receives a set of bits that are encoded and outputs the amplitude of the sine and cosine waves. However, a different sine and cosine frequency is used for each constellation encoder. The outputs from these different encoders are summed together and sent over a single channel for each direction of transmission. DMT systems divide the spectrum above the 4-KHz voice frequency band into 256 narrow channels called bins (sometimes referred to as tones, DMT tones or sub-channels). These bins are 4.3125 KHz wide. The waveforms in each bin are completely separable from one another. One key to separability is that the sine and cosine frequencies used in each bin should be multiples of a common frequency known as the fundamental frequency and in addition the symbol period $\tau$, must be the inverse of the common frequency. Another of way of producing a DMT symbol, other than mapping the output of the constellation encoder into a sine and cosine amplitude, is that the output can be mapped into a complex number in a vector. The value from the cosine axis, or X will represent the real part and the value from the sine axis, or Y will represent the imaginary part. If the outputs of all the constellation encoders are ordered in the vector, then each vector point represents one of the DMT bins and, if N bins existed in the DMT system, the complex vector would have N entries. A suffix containing the complex conjugates of the vector's original entries can be added to the vector such that the new vector has complex conjugate symmetry. An inverse Fourier transform (IFFT) on those N frequency bins is then used to convert the data from frequency domain to a time domain signal.

From a circuit standpoint, and in relation to discrete multitone modulation, the prior art shown in FIG. 1, is a transmitter side of a DMT transceiver. The transmitter accepts serial data which is then converted from serial to parallel form and to provide two hundred fifty-six signals $n_0$-$n_{255}$ via a serial to parallel converter 10 (P/S). The sequences are then passed on to a symbol-mapper 20 where each bit is assigned or mapped into one of N-complex (QAM) multi-level sub-symbols. The two hundred fifty-six symbols are complex-valued and are fed into an IFFT 30 which provides five hundred and twelve output real signals by taking the complex conjugates of the two hundred fifty six samples. The parallel outputs of the IFFT are applied to a cyclic prefix 40 which helps to make a channel circular so that equalization can occur more easily in the frequency domain. The output of the cyclic prefix block is then applied to a parallel to serial converter 50 to provide a serial output signal which is upsampled and interpolated by a digital filter 60. The output is processed by a digital-to-analog converter (DAC) 70 which converts the discrete time signal into a continuous time signal.

Spurious high amplitude peaks in the composite time signal occur when the signals from the different tones add constructively. Compared to the average signal power, the instantaneous power of these peaks are high, and consequently, so is the peak-to-average power ratio (PAR). These large peaks require a large dynamic range of the analog-to-digital converter (ADC) and analog front end (AFE) which result in inefficient amplifiers with excessive power dissipation and expensive transceivers. To overcome the drawbacks of the high PAR, many solutions and techniques have been proposed, one of which is, tone reservation method in which a pre-selected number of tones are set aside for PAR reduction. The information transmitted in these tones are used to subtract from the signal envelope, thus reducing the PAR, but at a cost of increased complexity at the transmitter.

Another method depends upon applying a combination of saturating non-linearity (clipping) at the transmitter and having the knowledge of the saturating characteristics at the receiver to iteratively decode the data vector without distortion by performing a number of tedious and costly fast FFT and IFFT computations.

Yet another method, known as selective mapping, involves generating a large set of data vectors all representing the same information in which the data vector with lowest PAR is selected. However, potential problems may arise with decoding the signal in the presence of noise where errors in the reverse mapping may result in the data of whole symbols being lost. Other drawbacks also exist.

SUMMARY OF THE INVENTION

The present invention provides a method and system for reducing the peak to average ratio (PAR) of single carrier and multi-carrier modulation such as discrete multi-tone DMT (sometimes called orthogonal frequency division multiplexing OFDM) as well as Carrier-less amplitude and phase modulation (CAP). Reducing the peak to average power (PAR) also reduces the complexity as well as the power consumption of the digital to analog converter (DAC). The present invention as described herein provides a reduction in the power to average ratio, while maximizing the computational capabilities of the processor by minimizing MIPS (millions of instructions per second), embodiments of the invention implement is fractional and local detection and mitigation of the PAR, meaning that both the peak detection and mitigation takes place at the oversampling rate (i.e., at T/K, where T is the regular sampling rate and K is an integer) and locally where the high peaks are detected.

The PAR-lowering method and system may be applied after the upsampling and interpolation filters and before the digital-to-analog converter. In contrast with the known methods of controlling the power to average ratio in multi-modulation schemes at both the transmitter and the receiver, but the present invention reduces the DMT (OFDM) and single carrier modulation peak to average ratio PAR at the transmitter and because of that, the receiver is not at involved in the PAR reduction mechanism. other advantages also exist.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

The following description is intended to convey a thorough understanding of the invention by providing a number of specific embodiments and details involving the PAR reduction techniques. Various improvements and modifications to the preferred embodiments will apparent to those skilled in the art, and the general principles defined herein may be applied to other embodiments. Therefore, the present invention is not limited to the specific embodiments shown and described, but interpreted to a larger scope consistent with the novel features disclosed herein.

Figure 3:
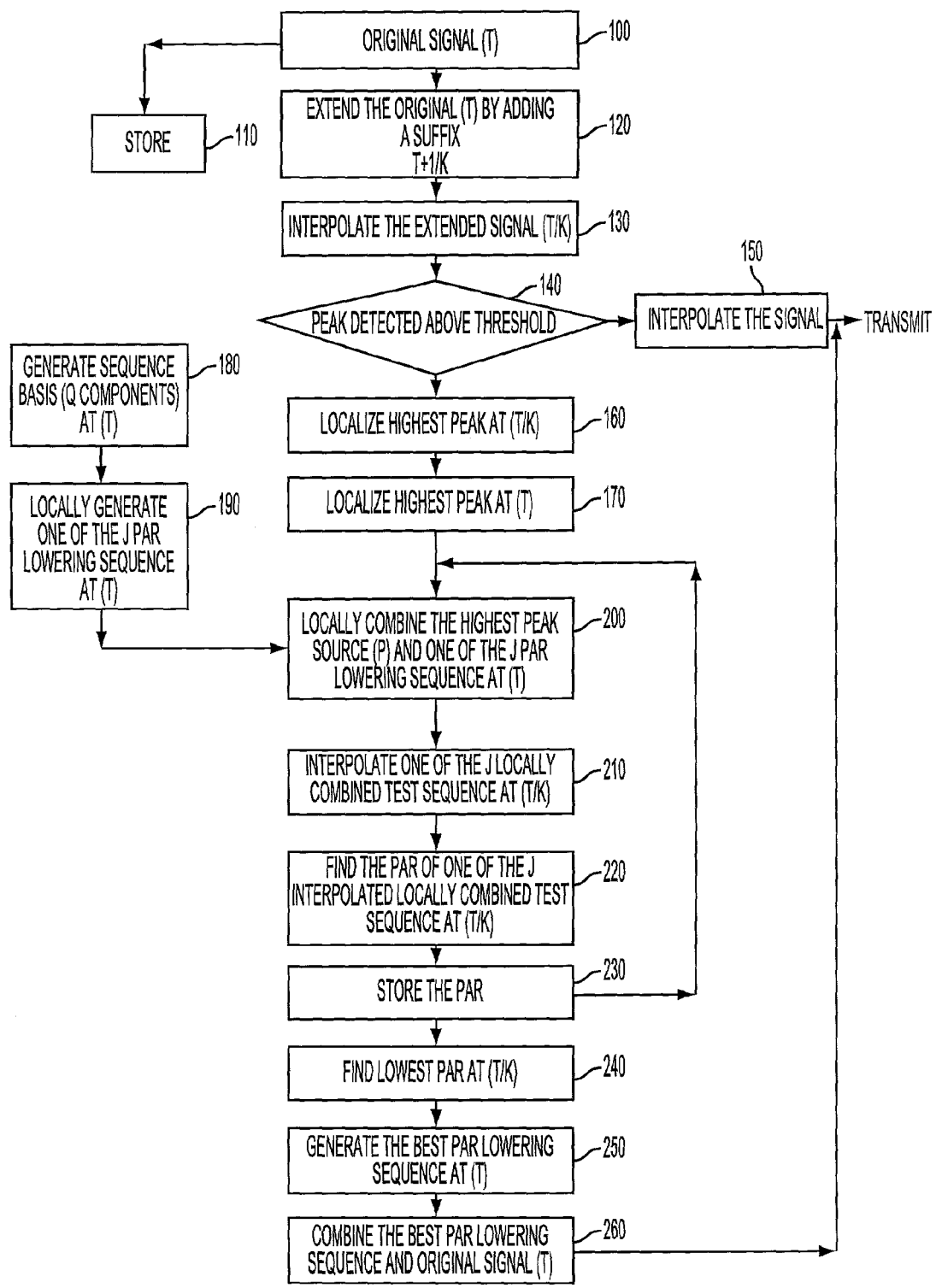
FIG. 3 is a flow chart of a PAR reduction technique using FLPDM according to some embodiments of the invention.
Figure 4:
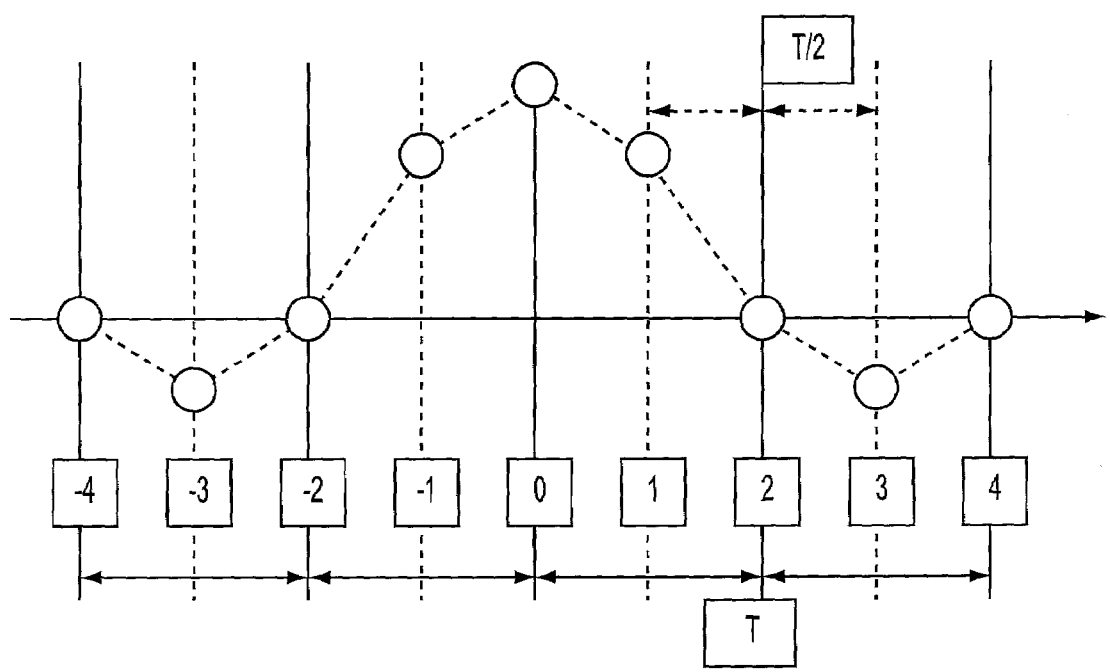
FIG. 4 is an interpolation impulse response at T/2 according to some embodiments of the invention.
Figure 5:
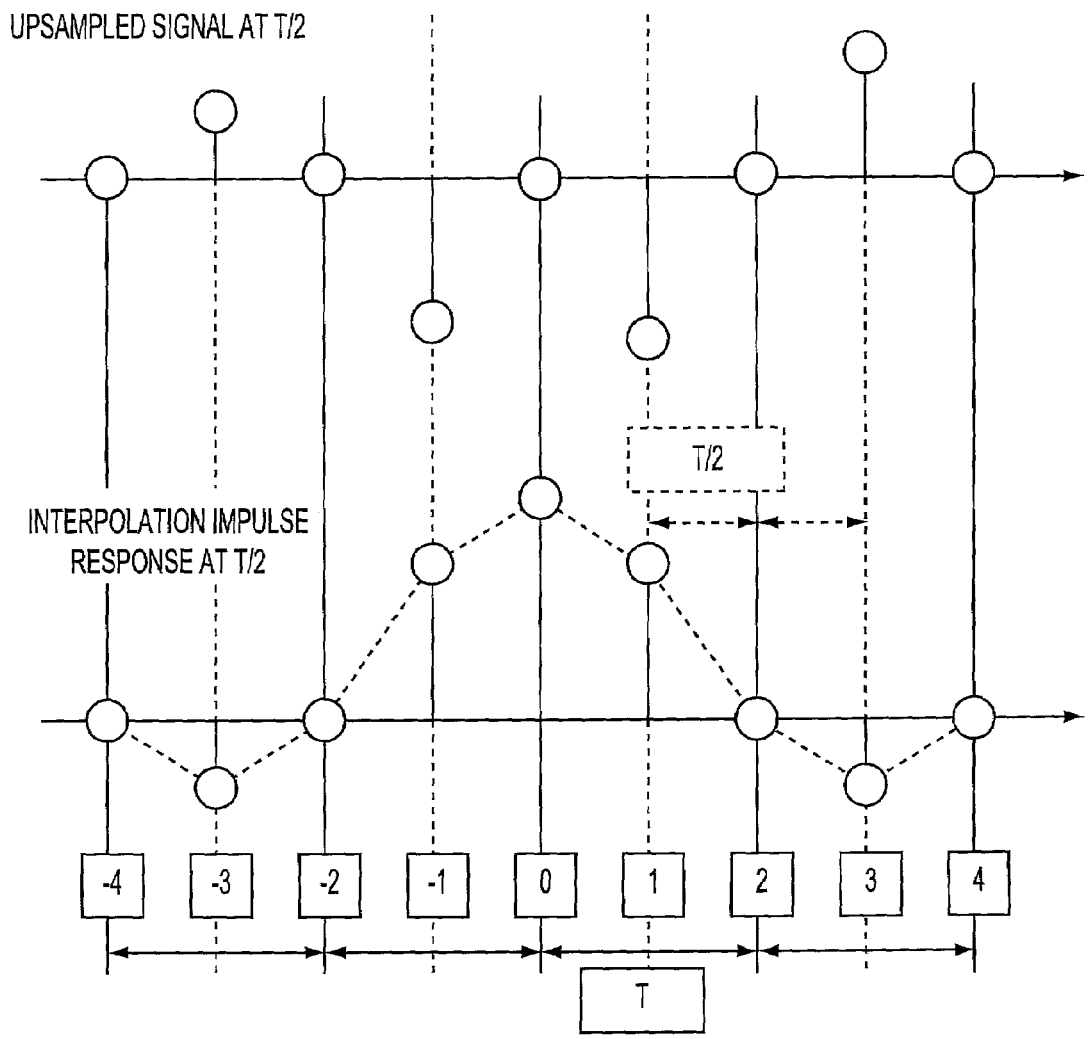
FIG. 5 shows where a negative value of T leads to a large negative value after upsampling and interpolation according to some embodiments of the invention.
Figure 6:
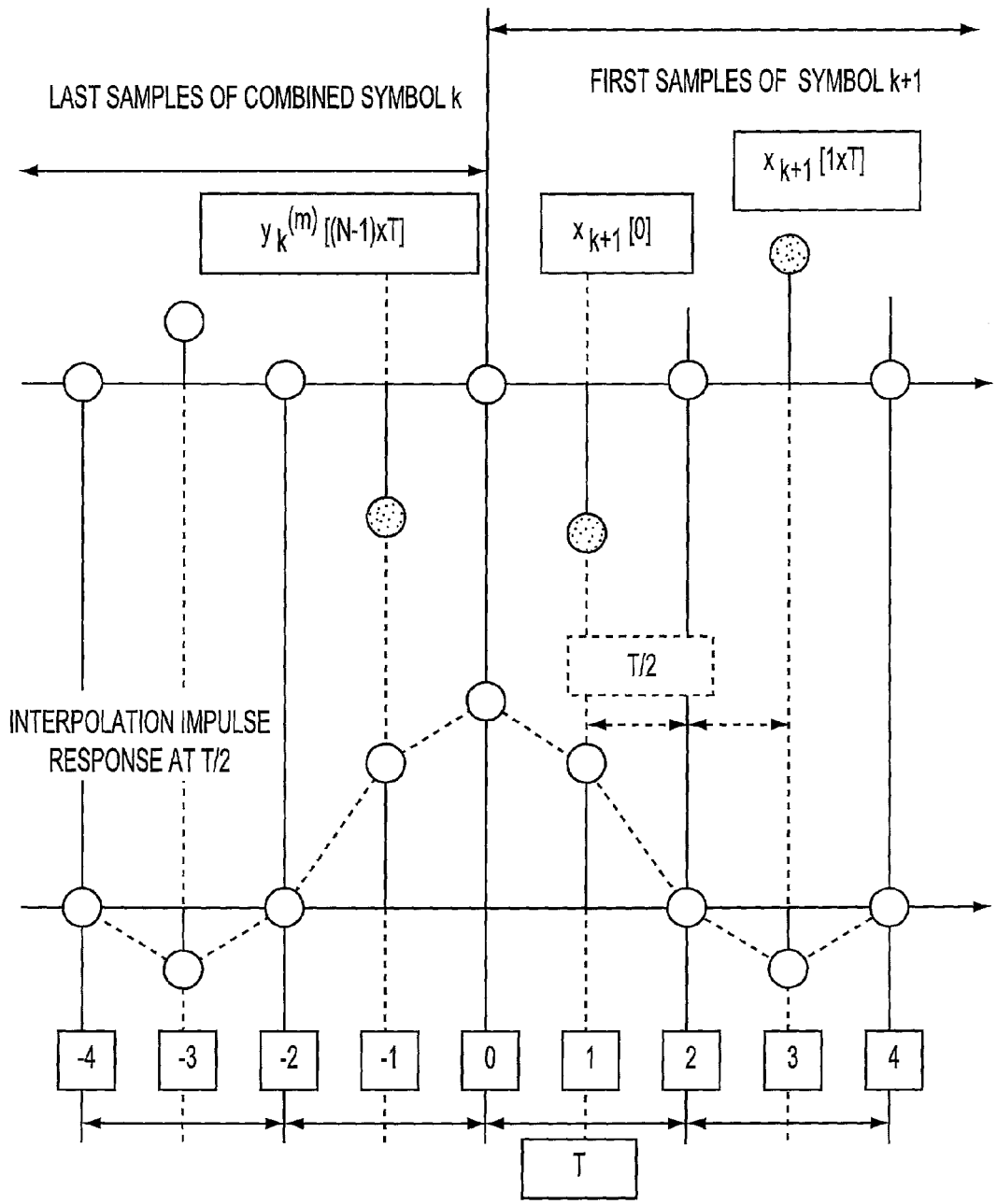
FIG. 6 is a high-PAR boundary situation according to some embodiments of the invention.
Figure 7:
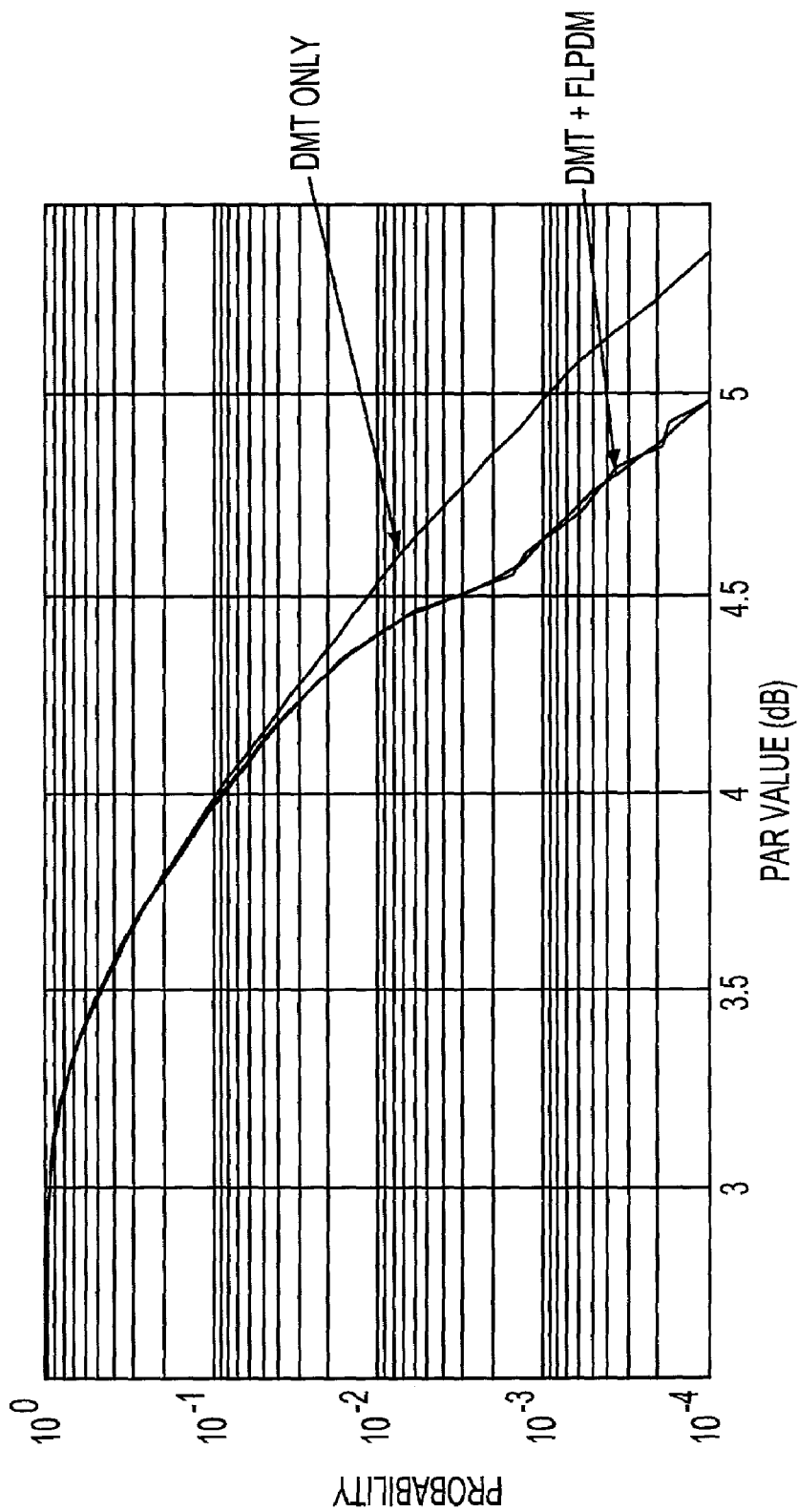
FIG. 7 is an FLPDM simulation result of a DMT PAR distribution density according to some embodiments of the invention.

FIG. 3 shows a PAR reduction technique where the original signal 100 is at the regular sampling rate (T) for multi-carrier and the baud rate for single-carrier modulation. Prior to implementing the necessary steps for lowering the PAR, signal 100 is stored as indicated in step 110. The signal may then be extended by adding a suffix T+1/K as indicated in step 120, by appending the new samples at the rate of T, such that the new samples repeat the last available samples. Such suffixes are chosen according to the last "current" symbol values which is expected to have a high PAR value of the next symbol. At step 130, the extended signal is upsampled and interpolated by an integer factor depending on the signal bandwidth and timing recovery.

At step 140, a threshold is set by calculating the standard deviation σ of the signal, this is achieved by taking the square root of the variance, $$\sigma = \sqrt{\sigma^2}, \text{ where,}$$

$$\sigma^2 = \frac{1}{N-1} \sum_{i=0}^{N-1} (x_i - \mu),$$

$\sigma^2$ is the variance,
$x_i$ is the signal samples,
$\mu$ is the average value of the signal,
N is the number of samples;

and hence the threshold peak is determined from the probability density function.

Figure 1:
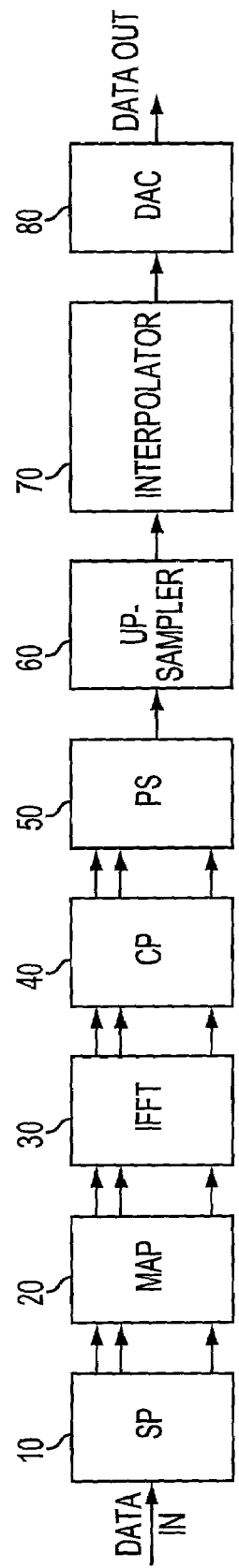
FIG. 1 is a schematic block diagram of a prior art Discrete Multi-tone (DMT) transmitter.
Figure 2A:
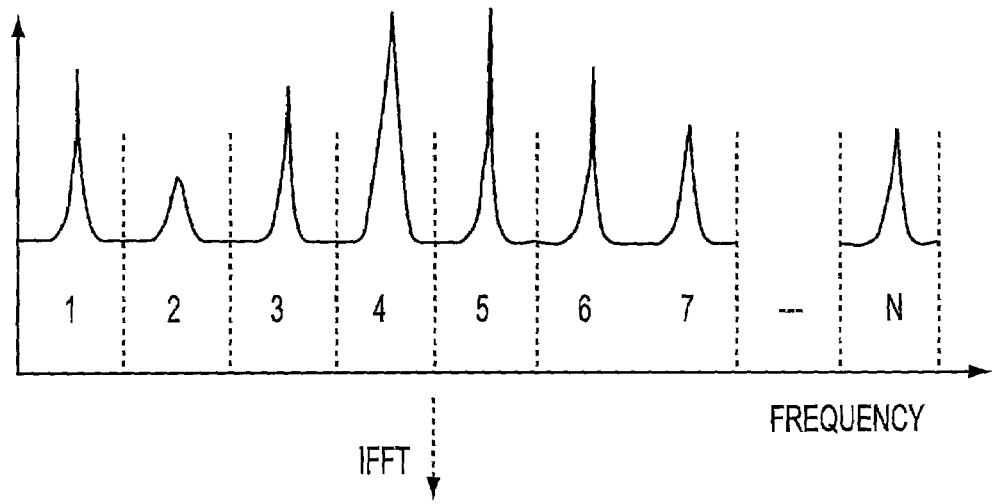
FIG. 2A is a frequency-domain response of a prior art DMT signal.
Figure 2B:
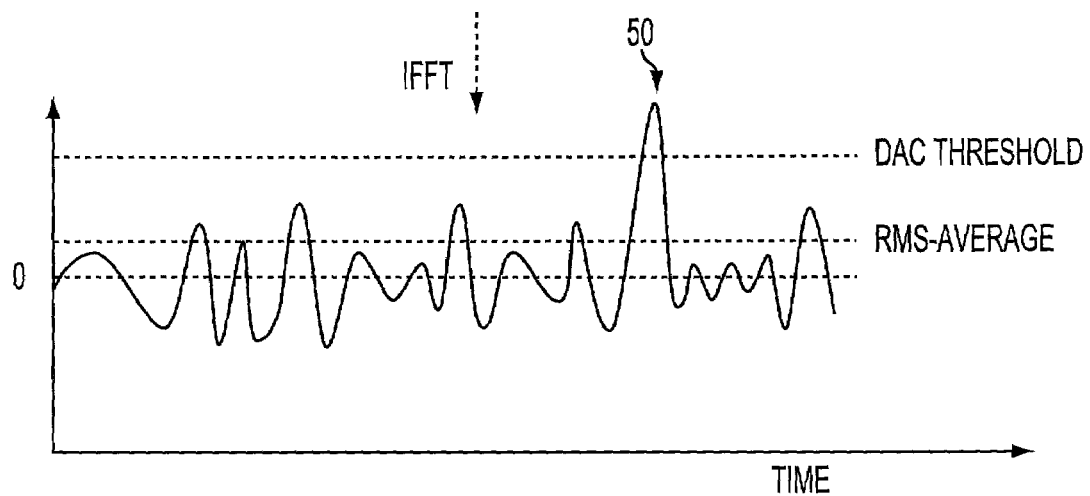
FIG. 2B is a is a time-domain response of a prior art DMT signal.

Normally, any signal peaks that exceed the DAC threshold can not be accurately converted and thus, may be clipped which will result in loss of information (e.g., FIG. 2B). Once the threshold is set in step 140, a peak-detection algorithm may be used to detect for signal peaks (P) that exceed the set threshold. In the event that no signal peaks exceed the threshold, the extended original signal is interpolated and then transmitted, as indicated at step 150.

One of the exemplary steps in the invention is to localize such peaks (P), into the neighborhoods were they occur. Neighborhoods may be formed at the regular sampling rate of T, as indicated in step 160, as well as the extended rate of T/K, as indicated in step 170. In step 180, a sequence basis (Q) may be generated by injecting in the time domain an optimal binary (+1, −1) combination of the Q basis sequence, where Q is any number (L) of packets of 4 tones each. Such combination takes place at the scale of one extended symbol for multi-carrier modulation and at an integer M for single-carrier modulation. As indicated in step 190, another sequence (J), which a sub-sequence of the Q basis sequence is locally generated at (T), such that $J=2^Q$, when Q=4, for example, J will be $2^4=16$ sub-sequences.

In step 200, one of the locally generated sub-sequences is combined with (P), the localized highest peak sources that exceeded the threshold. Such a combination takes place locally at the rate of (T). Next, in step 210, the combination is upsampled and interpolated at the fractional rate of (T/K), and then the PAR is determined from the upsampled, interpolated combination of J+P as indicated in step 220. The PAR is stored and the process may be re-visited again where another of the locally generated sub-sequences is combined with (P). The highest of the locally detected peaks and the combination upsampled, may be interpolated and the PAR determined and stored.

After an iterative operation, as indicated in step 240, the lowest PAR is chosen from all the stored PAR at the local fractional rate of T/K. In step 250, the PAR lowering sequence which produces the lowest PAR is generated at the rate for all the samples where it is combined in step 260 with the originally stored signal of step 110 and then transmitted.

Figure 8:
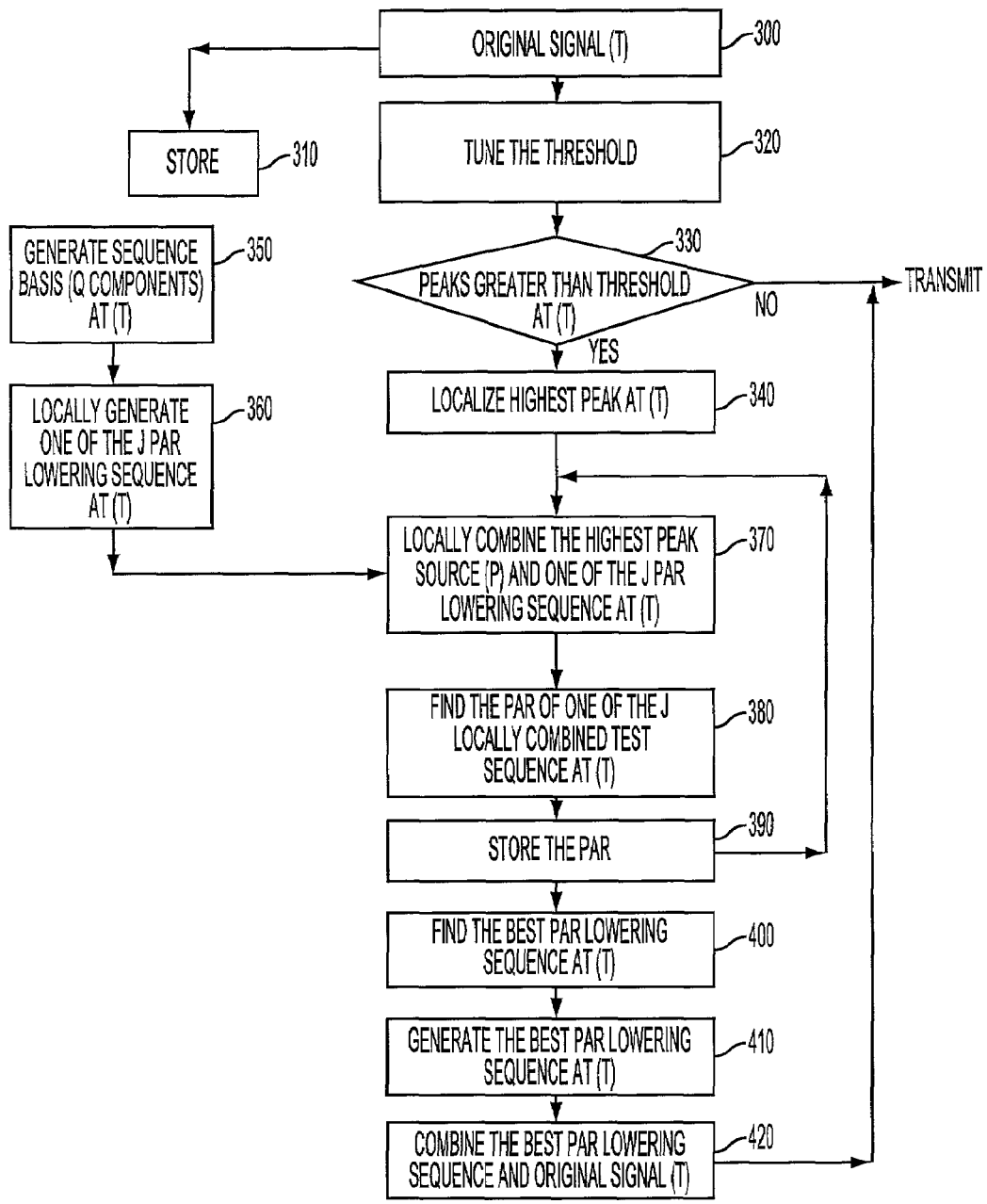
FIG. 8 is a flow chart of a PAR reduction technique using SLPDM according to some embodiments of the invention.

In another embodiment, as shown in FIG. 8, a PAR reduction technique may be implemented where the original signal 300 is at the regular sampling rate (T) for multi-carrier and the baud rate for single-carrier modulation, and prior to implementing the necessary steps for lowering the PAR, signal 300 is stored as indicated in step 310. A threshold is tuned 320, similarly to the tuning indicated in step 140. At step 330, a peak-detection algorithm is used to detect for signal peaks that exceed the tuned threshold, such high peaks are localized to the regular rate (T) which is the classical sampling rate for multi-carrier modulation and the baud rate for single-carrier modulation. In step 350, a sequence basis (Q) is generated by injecting in the time domain an optimal binary (+1, −1) combination of the Q basis sequence, where Q is any number (L) of packets of 4 tones each, such combination takes place at the scale of one extended symbol for multi-carrier modulation and at an integer M for single-carrier modulation; and in step 360, another sequence (J) which a sub-sequence of the Q basis sequence is locally generated at (T), such that $J=2^Q$, when Q=4, for example, J will be $2^4=16$ sub-sequences.

In step 370, one of the locally generated sub-sequences is combined with (P), the localized highest peak sources that exceeded the threshold, such a combination takes place locally at the rate of (T). Next, as indicated in step 380, the PAR is determined from the combination of J+P found in step 370. The PAR-lowering sequence is stored as indicated in step 390 and the process shown in steps 350, 360 and 370 are re-visited to calculate another PAR-lowering sequence that is then stored. After an iterative operation, and as indicated in step 400, the best PAR-lowering sequence is chosen from all the stored PAR-lowering sequences at the local rate of (T). In step 410, the best PAR-lowering sequence is then generated at the local and then the original stored signal in step 310 is added to the lowest PAR-lowering sequence at (T) and then transmitted.

Figure 10:
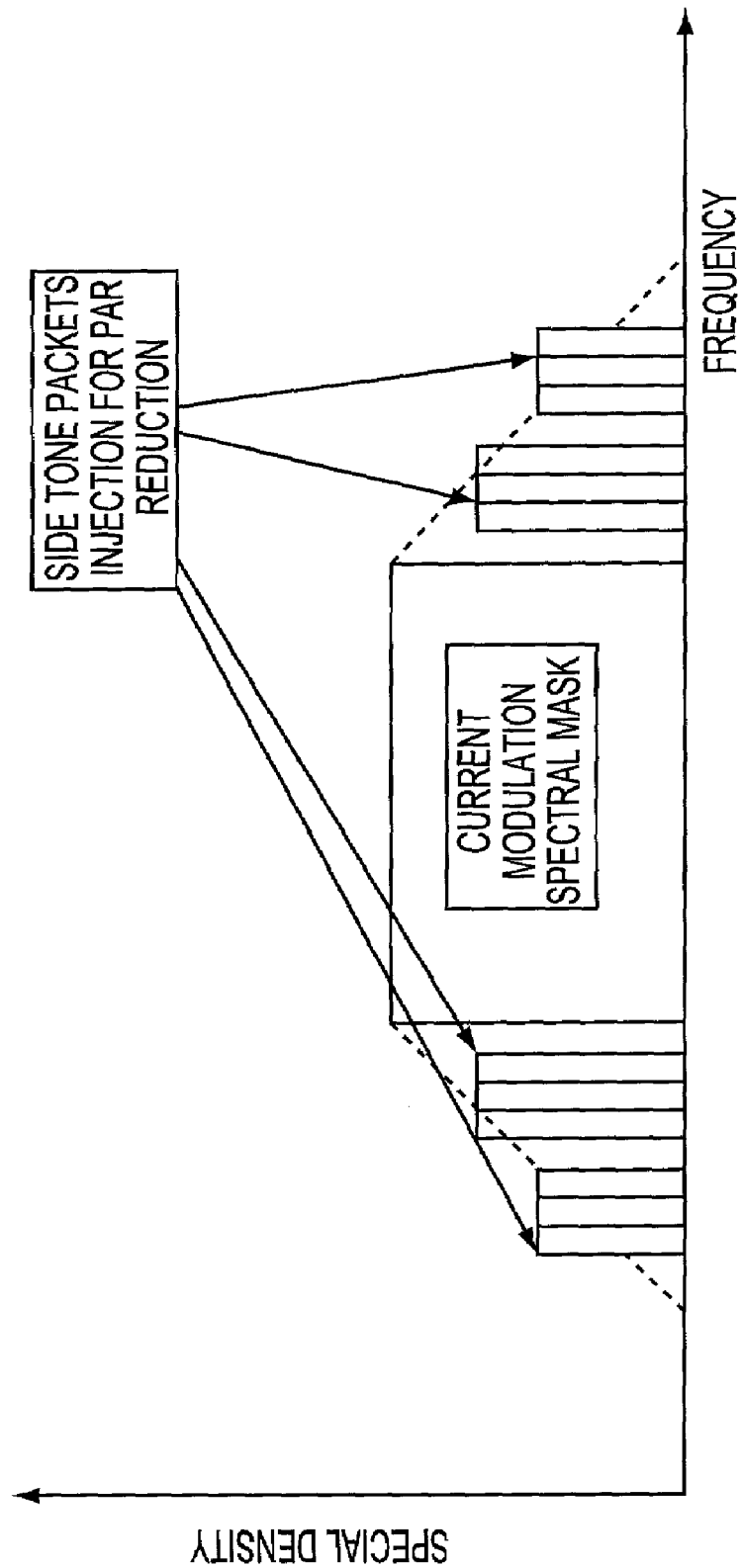
FIG. 10 is a frequency-domain side tone injection according to some embodiments of the invention.
Figure 11:
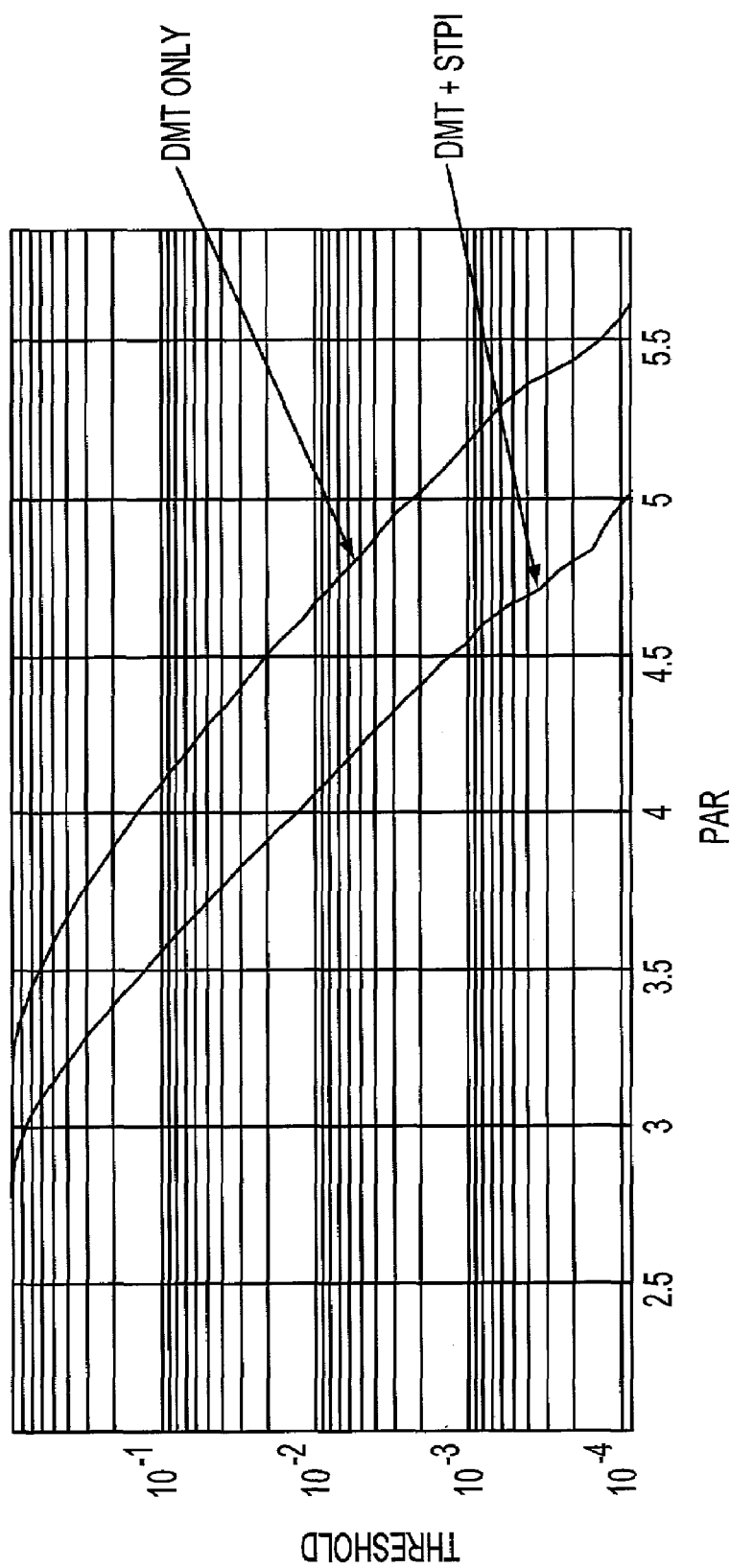
FIG. 11 is an STPI simulation PAR result applied to ADSL-DMT modulation according to some embodiments of the invention.
Figure 12:
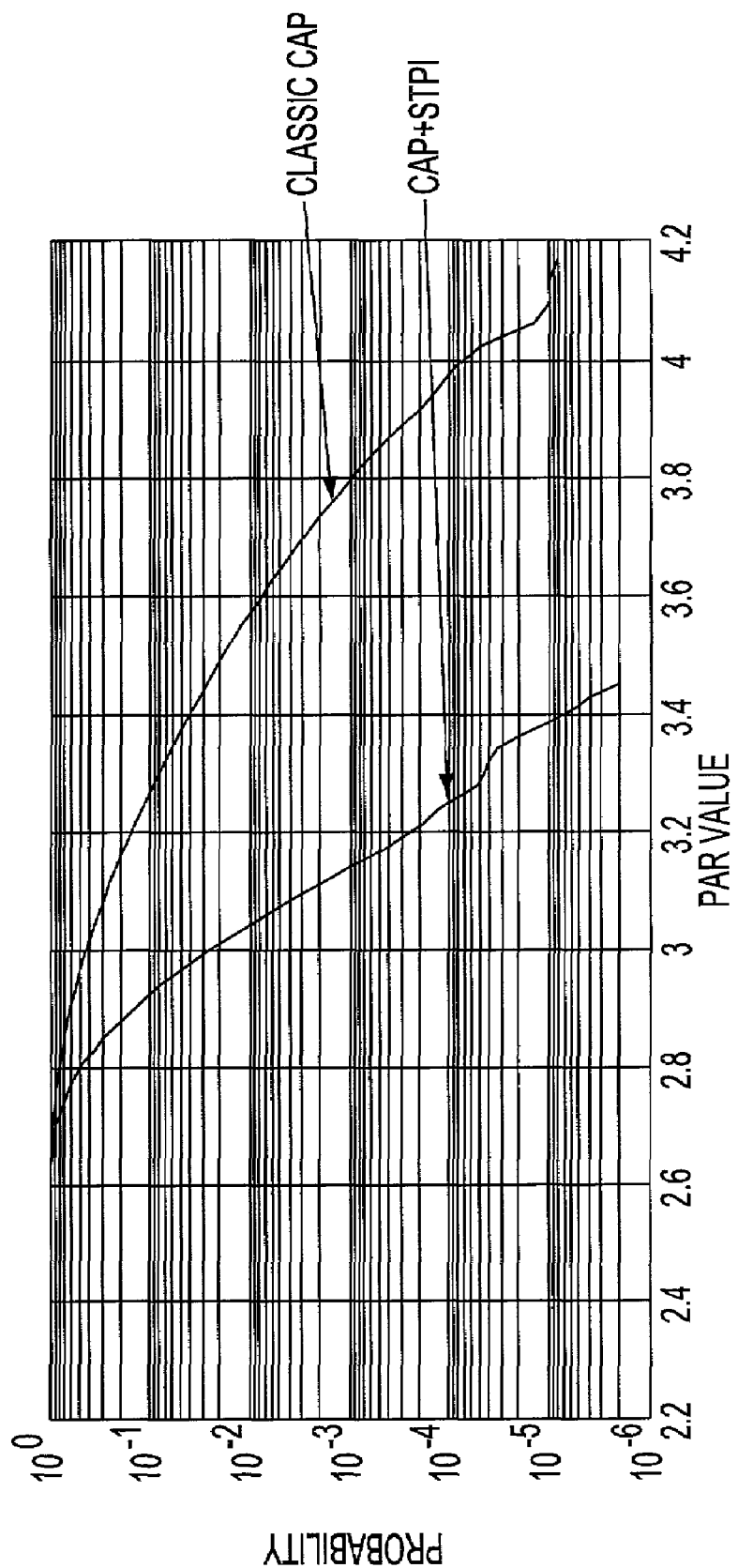
FIG. 12 is an STPI simulation PAR result applied to CAP modulation according to some embodiments of the invention.
Figure 13:
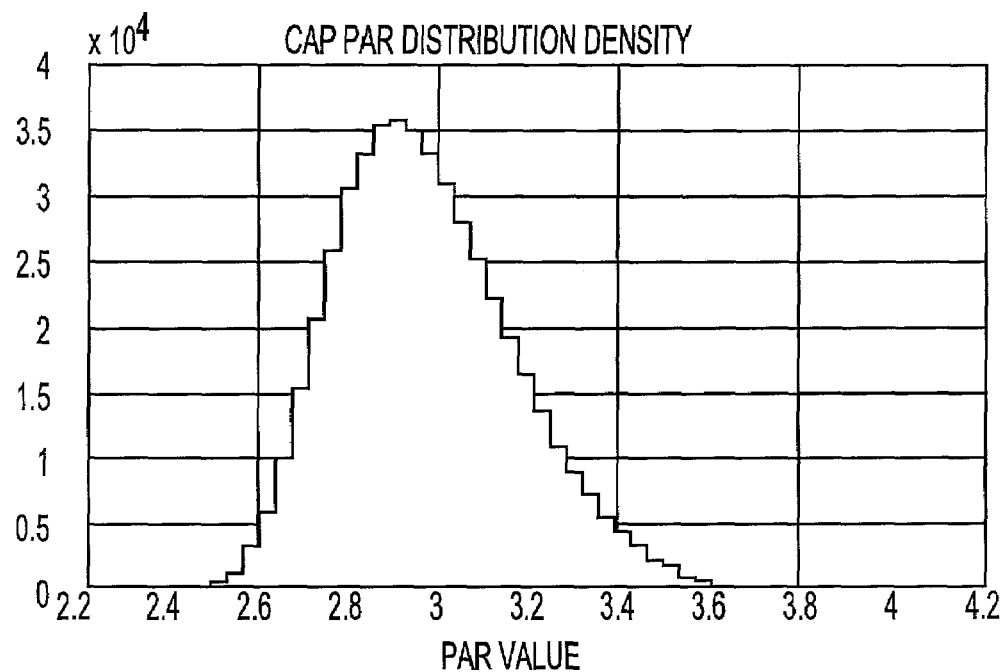
FIG. 13 is an STPI simulation PAR result applied to CAP modulation at T/2 according to some embodiments of the invention.
Figure 14:
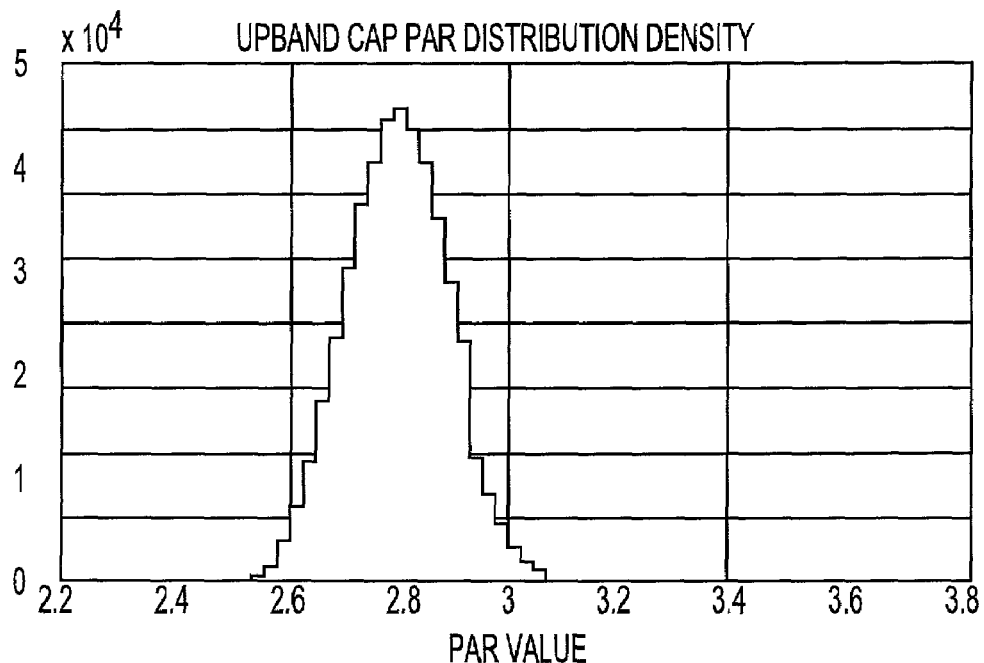
FIG. 14 is a PAR histogram for classical CAP according to some embodiments of the invention.
Figure 15:
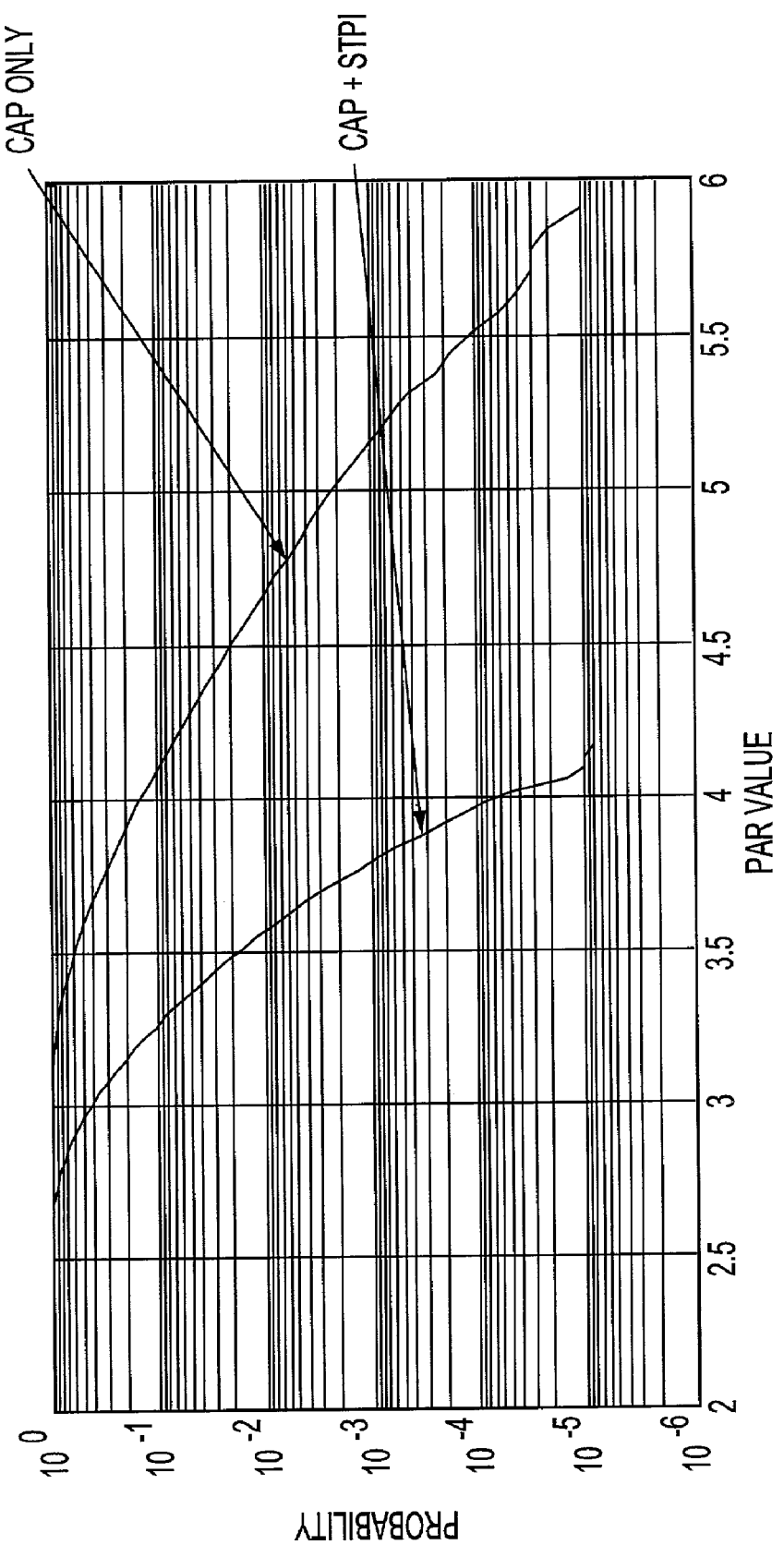
FIG. 15 is a PAR histogram for classical CAP+STPI according to some embodiments of the invention.
Figure 16:
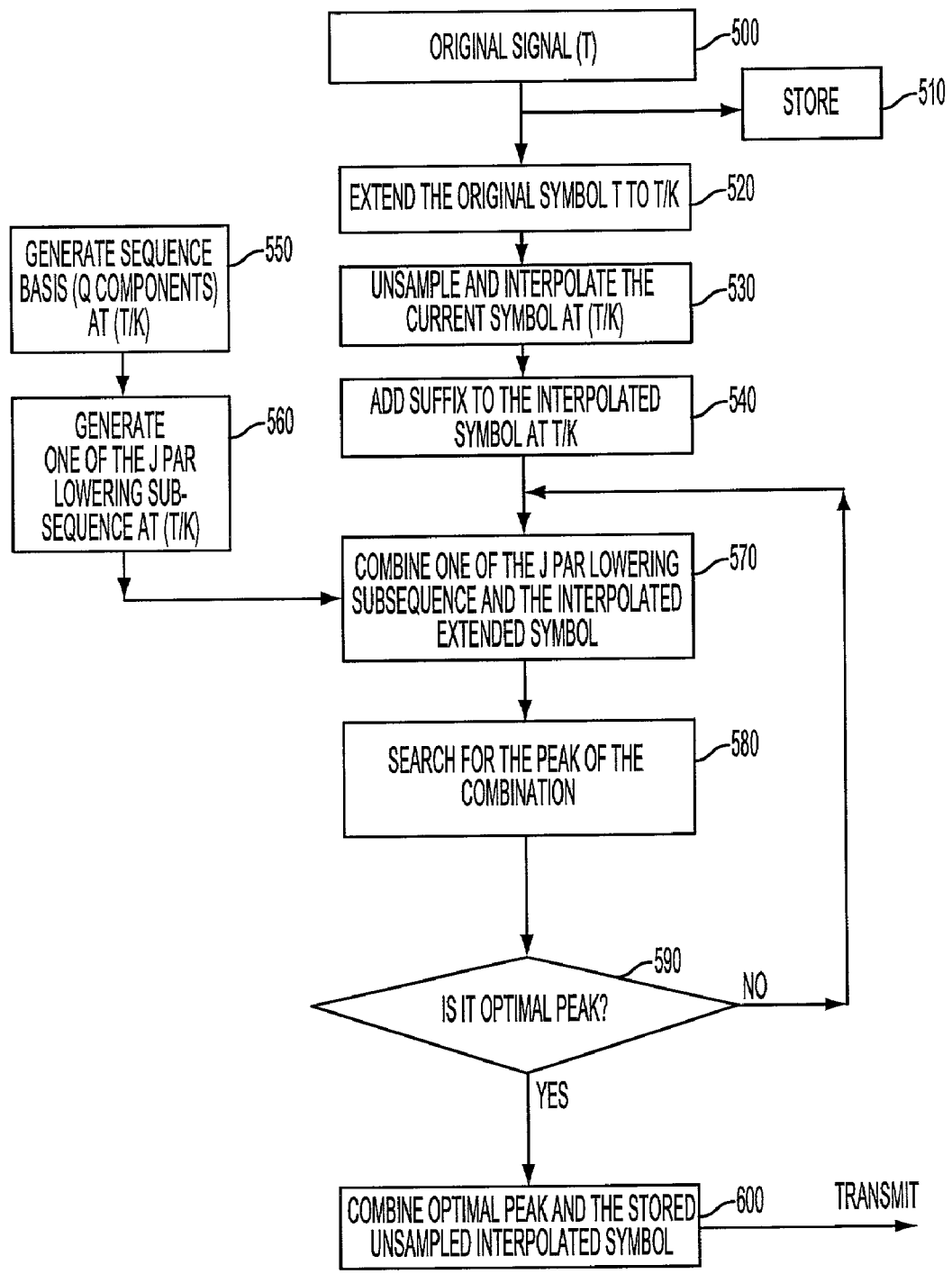
FIG. 16 is a flow chart of a PAR reduction technique using STPI according to some embodiments of the invention.

Another embodiment of this invention may be illustrated with reference to FIG. 10. FIG. 10 shows that tone packets may be added on either side of the spectral mask. This embodiment provides a method of injecting, in the time domain, an optimal binary combination (+1, −1) which leads to the minimum PAR desired, and combining of Q tones. Such a combination takes place at the scale of one symbol for multi-carrier modulation and at the scale of any number of symbols for single-carrier modulation, where such tones (or packets) are loaded into the first quadrant of a QAM-4.

Figure 9:
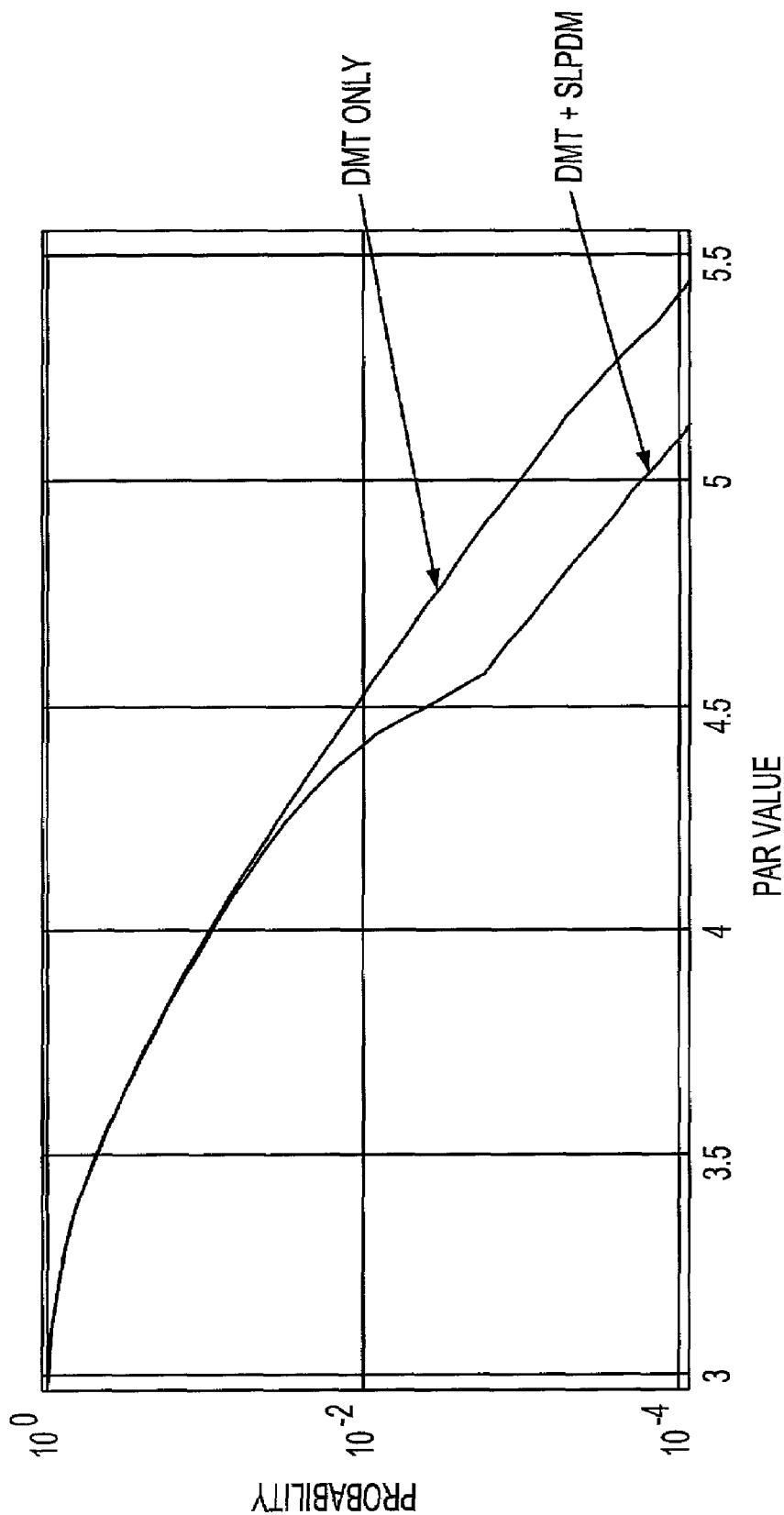
FIG. 9 is an SLPDM simulation result of a DMT PAR distribution density according to some embodiments of the invention.

FIG. 9, shows a PAR reduction technique where a discrete time signal, as indicated in step 500, is sampled at the regular sampling rate (T) for multi-carrier and the baud rate for single-carrier modulation. Prior to implementing any of the necessary steps for lowering the PAR, the signal 500 may be stored as indicated in step 510. The signal is then extended by adding a suffix T+1/K, as indicated in step 520. The DMT real-valued symbol k is denoted by N time samples at the regular sampling rate; by appending new samples at the rate T in which new samples would be repeating the last available samples. Such suffixes are chosen according to the last "current" symbol values which is expected to have a high PAR value of the next symbol. At step 530, the extended original symbol is upsampled so that the actual output sample rate matches the desired rate, and interpolated by an integer factor, which depends upon the signal bandwidth and the accuracy of the timing recovery. At step 540, a suffix is added to the upsampled, interpolated symbol of step 530. In step 550, a sequence basis (Q) is generated by injecting in the time domain an optimal binary (+1, −1) combination of the Q basis sequence which are the number of signal packets, such combination takes place at the scale of one extended symbol for multi-carrier modulation and at any integer M for single-carrier modulation. In step 560, another sequence (J) which a sub-sequence of the Q basis sequence is locally generated at (T/K), such that $J=2^Q$, when Q=4, for example, J will be $2^4=16$ sub-sequences.

In step 570, one of the generated PAR-lowering sub-sequences is combined with the upsampled, interpolated extended symbol at the rate of (T). Next, as indicated in step 580, peaks are searched that result from the combination of produced in step 570. In step 590, optimal peaks, which will result in a low, acceptable PAR are determined from the detected peaks and the optimal peaks are upsampled, interpolated and stored. In the event that an optimal peak is not determined in step 590, the process of steps 550, 560, 570 and 580 are re-visited until a combination is determined that yields an optimal peak.

After an iterative operation, and as indicated in step 610, the optimal peak and the original signal stored in step 510 are combined and transmitted. In reference to FIGS. 12, 13, 14 and 15 side tone packets injection (STPI) is shown to lower the PAR in single-carrier CAP modulation at the scale of 544 symbols and that a PAR of 1.8 dB is achieved at $10^{-4}$ error probability, which yields a 2 dB PAR improvement at $10^{-7}$. Also shown is a PAR comparison of CAP and DMT modulations.

Although a number of exemplary methods for lowering the PAR have been discussed, other variations of the techniques may be implemented without departing from the spirit or the scope of the present invention.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for reducing the peak-to-average ratio of a single-carrier or a multi-carrier modulated signal, the method comprising:

storing an original signal;

extending the original signal by adding a suffix to form an original extended signal;

interpolating and upsampling the original extended signal at a fractional sampling rate to form an extended interpolated signal;

localizing the extended interpolated signal to form a localized neighborhood;

setting a threshold for the extended, interpolated signal within the localized neighborhood;

tracing back across all the signal samples to detect for and mitigate the peaks that exceed the threshold in the localized neighborhood;

generating sequences basis (Q) by partitioning the available bins into a number of subsets, and taking N-dimensional inverse Fourier transforms of each subset at the rate of T;

locally generating a PAR lowering sub-sequence (J) at T, in the time-domain locally combining the PAR lowering sub-sequence (J) and a highest peak source at the scale of one extended symbol for multi-carrier modulation and at one or more of symbols for single-carrier modulation;

locally interpolating the combination of the sub-sequences and the highest peak source;

finding and determining if the PAR for one of the locally combined sub-sequences and the highest peak is a PAR-lowering sequence;

storing the PAR-lowering, locally combined sub-sequences and the highest peak;

from the stored, locally combined PAR lowering sub-sequences finding the one that yields the lowest PAR at the local rate of T/K;

generating the best PAR-lowering sub-sequence for all the samples at the rate of T; and combining the best PAR-lowering sub-sequence and the originally stored signal and, transmitting the signal.

2. The peak-to-average ratio reduction method of claim 1, where the original signal is extended by appending new samples at the rate of T, such that new samples will be repeating the last available samples.

3. The peak-to-average ratio reduction method of claim 1, where the
original extended signal is interpolated by a factor of 2.

4. The peak-to-average ratio reduction method of claim 1, where the threshold is determined by taking the standard deviation of the signal samples.

5. The peak-to-average ratio reduction method of claim 1, where the peak detection and mitigation is done at an oversampling rate of T/K, where T is the regular sampling rate and K is an integer.

6. The peak-to-average ratio reduction method of claim 1, where the interpolated, extended signal is again interpolated, upsampled and transmitted in the event that none of the signal peaks exceed the threshold.

7. The peak-to-average ratio reduction method of claim 1, where the locally generated PAR lowering sequence (J) at T is a subset of the sequence basis (Q) calculated as $J=2^Q$.

8. The peak-to-average ratio reduction method of claim 1, where extending the signal by adding the suffix anticipates a high PAR due to the boundaries time sample values between two successive samples.

9. The peak-to-average ratio reduction method of claim 1, where the sampling rate is a fractional sampling rate of T/K.

10. The peak-to-average ratio reduction method of claim 1, where the sampling rate is a fractional sampling rate of T.

11. The peak-to-average ratio reduction method of claim 1, where the PAR reduction is made at a transmitter.

* * * * *